P. H. CALMUS.
PUNCTURELESS VEHICLE TIRE.
APPLICATION FILED JULY 10, 1911.
1,059,115.
Patented Apr. 15, 1913.
2 SHEETS—SHEET 1.
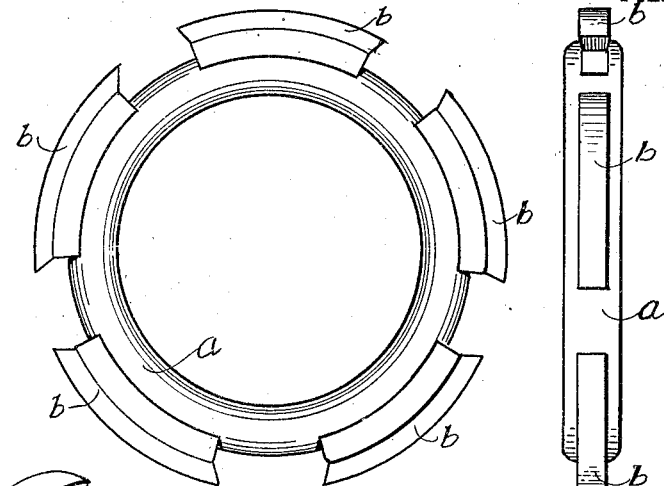
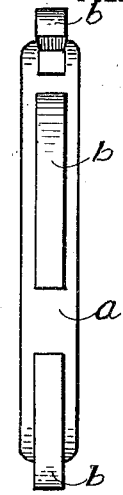
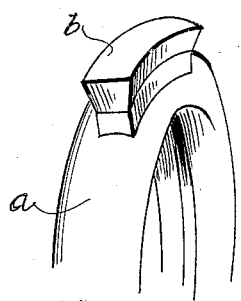
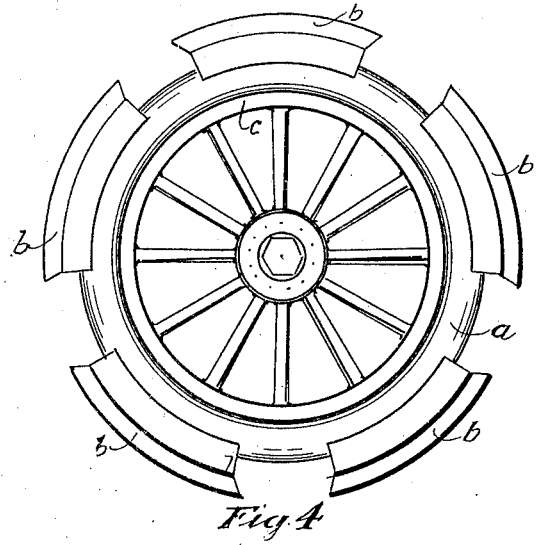
WITNESSES:
INVENTOR

P. H. CALMUS.
PUNCTURELESS VEHICLE TIRE.
APPLICATION FILED JULY 10, 1911.

1,059,115.

Patented Apr. 15, 1913.

2 SHEETS—SHEET 2.

UNITED STATES PATENT OFFICE.

PHILLIP H. CALMUS, OF BIRMINGHAM, ALABAMA.

PUNCTURELESS VEHICLE-TIRE.

1,059,115.  Specification of Letters Patent.  Patented Apr. 15, 1913.

Application filed July 10, 1911. Serial No. 637,799.

*To all whom it may concern:*

Be it known that I, PHILLIP H. CALMUS, a citizen of the United States, residing at Birmingham, in the county of Jefferson and State of Alabama, have invented certain new and useful Improvements in Punctureless Vehicle-Tires, of which the following is a specification, reference being had therein to the accompanying drawing.

My invention relates to an improved punctureless vehicle tire; and the object of my invention is to provide a tire which cannot be punctured.

A further object of my invention is to provide a greater amount of elasticity in a tire than is usually found.

With these objects in view I have illustrated my invention in the accompanying drawings, described the same in the specification and claimed the essential parts thereof.

Figure 6:
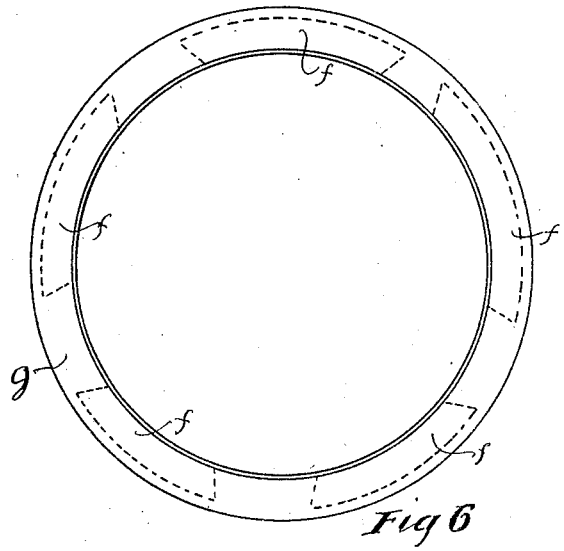
Figure 7:
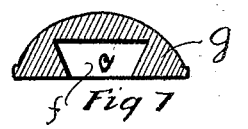
Figure 8:
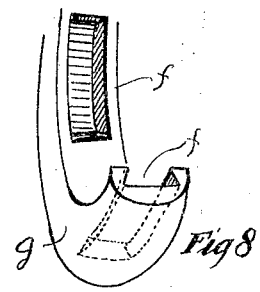
Figure 10:
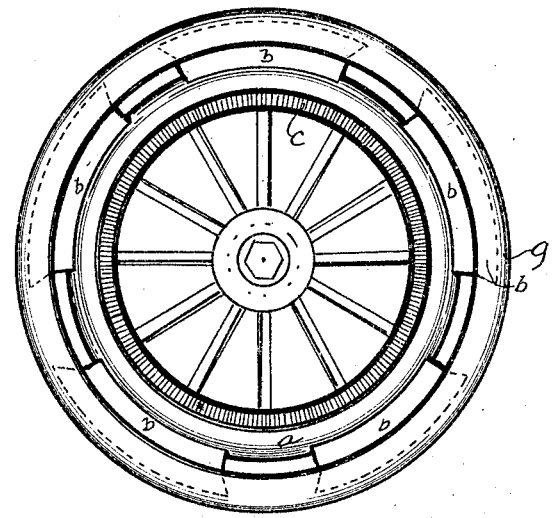
Figure 9:
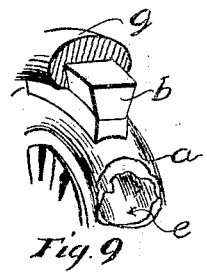
Figure 5:
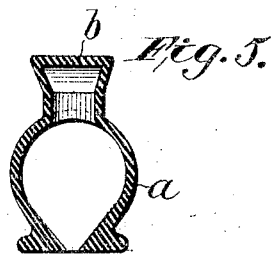

In the drawings: Figure 1 is a side elevation of the punctureless tire and cushions; Fig. 2 is an end view of the tire shown in Fig. 1; Fig. 3 is a detail view of a portion of the tire and cushion inflated; Fig. 4 is a side elevation of the tire and cushion mounted upon a wheel; Fig. 5 is a sectional view through air cushion shown in Fig. 1; Fig. 6 is a side view of the solid rubber tire showing recesses in dotted lines; Fig. 7 is a cross sectional view of a portion of the rubber tire showing the recess into which the cushion is adapted to fit; Fig. 8 is a detail view showing the said recess as seen from the inner side of the solid rubber tire; Fig. 9 is an end view, with parts broken away, showing the manner in which the inner tube is mounted upon a wheel and the solid rubber tube is fitted over the cushions; and Fig. 10 is a side elevation of a wheel equipped with my invention.

Referring to the drawings, $a$ represents the inner tube and $b$ the cushions which are made in one piece with said inner tube. $f$ (Figs. 7 and 8) shows the recesses in the solid rubber tire $g$ into which the said cushions $b$ are adapted to fit. These recesses $f$ are lined with metal as shown at $c$ (Fig. 7).

It will readily be seen that by means of my invention practically a punctureless tire is provided, as the cushions, formed with the inner tube, when inflated, fit into the metal lined recesses in the solid rubber tire. There is no way in which the inner tube can be reached by anything which would tend to produce a puncture, since it does not come into contact with the solid rubber tire excepting at the points where the cushions, formed integral with said inner tube, fit into the metal lined recesses in the solid tire. This is well illustrated in Fig. 10. It is also clear, from the showing made in Fig. 10, that the tire has a great amount of resiliency or elasticity.

While I have shown but five cushions in my drawings, it is obvious that both the number and size of the said cushions may be varied without departing from the spirit and scope of my invention.

What I claim is:

In a vehicle tire, a solid rubber tire, having wedge-shaped recesses formed at intervals upon its hub side, an inflatable inner tube, air cushions made integral with said inner tube, said cushions being adapted to fit into said wedge-shaped recesses in the solid rubber tire, whereby the inner tube is protected and held firmly from motion relative to said solid rubber tire.

In testimony whereof I affix my signature.

PHILLIP H. CALMUS.

In the presence of—
F. A. BERKSTRASER,
T. T. PARKER.